No. 701,944. Patented June 10, 1902.
J. SALTAR, Jr.
EXHAUST VALVE FOR INTERNAL COMBUSTION ENGINES.
(Application filed Sept. 19, 1900.)
(No Model.)

WITNESSES:
James H Bell
E. Reese

INVENTOR:
John Saltar, Jr.
By Raley & Paul,
Attorneys.

UNITED STATES PATENT OFFICE.

JOHN SALTAR, JR., OF PHILADELPHIA, PENNSYLVANIA.

EXHAUST-VALVE FOR INTERNAL-COMBUSTION ENGINES.

SPECIFICATION forming part of Letters Patent No. 701,944, dated June 10, 1902.

Application filed September 19, 1900. Serial No. 30,464. (No model.)

*To all whom it may concern:*

Be it known that I, JOHN SALTAR, Jr., a citizen of the United States, residing at Thirty-third and Walnut streets, in the city and county of Philadelphia and State of Pennsylvania, have invented certain new and useful Improvements in Exhaust-Valves for Internal-Combustion Engines, whereof the following is a specification, reference being had to the accompanying drawings.

Figure 1:
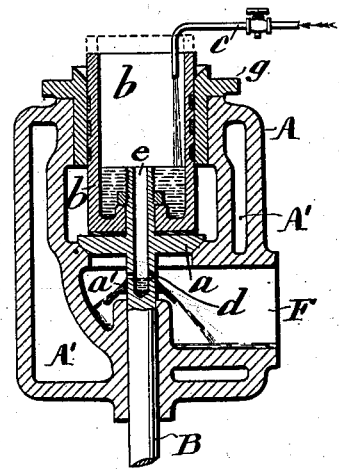
Figure 3:
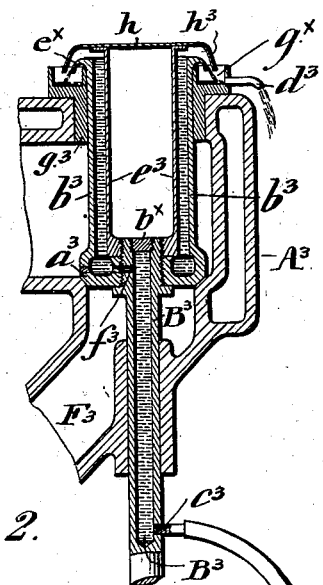
Figure 2:
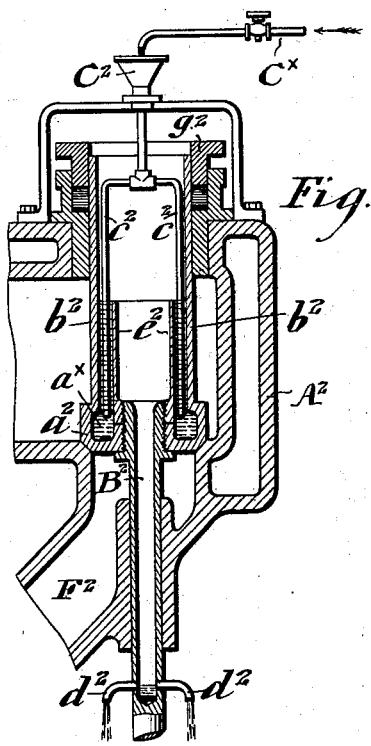

In said drawings, Figure 1 represents a vertical central section through the exhaust-chamber and exhaust-valve of an engine with my invention applied thereto. Fig. 2 is a similar section through the combustion-chamber of an engine with my invention applied in a modified form. Fig. 3 is a similar section showing a third modification.

In said drawings the adjacent parts of the combustion-chamber and the controlling mechanism for the exhaust-valve are not represented, since their construction and relation to the parts now under consideration are well understood.

It is well known that the exhaust or discharge valves of internal-combustion engines are subject to excessive heats and great pressures and that in such valves of larger sizes the heating becomes so great as to be troublesome by causing preignitions of charges and also undue wear upon the seat. Furthermore, in such large valves the strains upon the mechanism for operating them become too severe.

It is the object of my invention, first, to cool the valve sufficiently to prevent the troubles from excessive heat, and, secondly, to partially balance the valve, so that it may be more easily lifted from its seat against the internal pressure. I accomplish the result desired by placing an extension upon the head of the exhaust-valve and projecting this extension through the wall of the valve-casing or combustion-chamber, using suitable packing where passing through the wall to prevent the escape of gases under pressure. The interior of this extension is more or less filled with a circulating cooling medium, which, coming in contact with the portion of the valve-head inclosed within the extension, carries off the heat from that portion of the head which yet remains exposed to heated gases and also keeps cool the extension itself. Furthermore, that portion of the valve-head which is covered by the extension is relieved from the pressure within the cylinder and subject only to atmospheric pressure, and in this manner by properly proportioning the diameter of the extension to the diameter of the valve itself I am enabled to partially balance the valve to any desired extent, it being self-evident that it is not well to fully balance it, since a certain amount of pressure of the gases upon the head of the valve is desirable in order to hold it firmly upon its seat. For this reason I always make the extension less than the diameter of the valve itself.

In some forms of internal-combustion engines the exhaust-valve is situated within the combustion-chamber proper, while in others it is formed within a supplemental chamber connecting therewith, which is called the "exhaust" or "discharge" chamber. In the drawings I have illustrated my invention as applied to valves in both of these situations, and I have also illustrated different modifications of my invention in reference to means for securing the circulation of the cooling medium.

In Fig. 1 the valve is represented as situated within a supplemental exhaust-chamber, the casing of which alone is illustrated, no part of the combustion-chamber itself being seen. A represents the casing of this exhaust-chamber, the casing being fitted with the usual water-space A'. The exhaust-valve is indicated at $a$ and carries on its upper surface a cylindrical extension $b$, which passes out through a bushing $g$ in the top of the casing, and thus forms an extension-chamber, which in this instance is entirely open to the atmosphere. The valve $a$ is provided with a stem B, whose upper portion is formed with a cylindrical cavity (indicated at $e$) communicating with the interior of the extension-chamber, the top of the stem rising somewhat above the bottom of the chamber, as shown. Below the valve $a$ a transverse hole $d$ is formed through the stem, affording discharge-orifices from the central cavity therein, an outwardly-flaring shield $a'$ being placed around the stem below said orifices. The orifices $d$ discharge into the exhaust-passage F, which leads from the valve $a$. The cooling medium, preferably water, is supplied through the pipe $c$, the supply being regulated in accordance with the requirements of the apparatus.

When the device is in operation, the incoming cold water being heavier than that which has become warm falls to the bottom of the extension-chamber, where the greatest exposure to heat exists. The body of water is maintained at a level determined by the height of the internally-projecting hollow stem. At this point the water overflows into the cavity $e$ and passing down is discharged through the orifices $d$, whence it escapes at the exhaust-passage F, the shield $a'$ preventing the leakage of water along the stem itself.

The upper portion of the extension-chamber does not always need the direct application of water, (being somewhat protected by its inclosure within the bushing $g$ and being also open to the atmosphere,) and hence the water-level may be limited, as above indicated.

In the type of apparatus shown in Fig. 2 the valve is situated at the end of the combustion-chamber. Consequently the extension of the valve projects through the casing of this chamber. $A^2$ represents the water-cooled casing of the combustion-chamber, and $a^2$ the exhaust-valve. The downwardly-extending stem $B^2$ is hollow and is provided with discharge-jets $d^2$. In this instance the valve-body itself is made hollow, having an annular water-space $a^\times$, and is formed integrally with an upwardly-projecting cylindrical extension $b^2$, projecting out through a bushing $g^2$ in top of the casing. A hollow displacement-cylinder $e^2$ is mounted within the extension-chamber, so as to leave an annular interspace between the wall of the displacement-cylinder and the wall of the cylindrical extension. Water-inlet pipes $c^2$ $c^2$ terminate within this interspace, said pipes uniting in a funnel-shaped inlet $C^2$, to which water is supplied through the pipe $C^\times$. The displacement-cylinder $e^2$ surrounds the inlet to the hollow valve-stem $B^2$, and its height is in correspondence with the region throughout which it is desired to maintain the water in contact with the wall of the extension-chamber. The water which is discharged by the supply-pipe $c^2$ directly within the hollow valve-body rises therefrom into the annular space around the displacement-cylinder and overflowing into the latter is discharged through the hollow valve-stem, escaping at the jets $d^2$.

In the type of apparatus shown in Fig. 3, $A^3$ represents the casing of the combustion-chamber, and $F^3$ the exhaust. The exhaust-valve $a^3$ is hollow, having an annular water-space which communicates by an opening $f^3$ with the interior of the hollow valve-stem $B^3$. The cylindrical extension $b^3$, formed integrally with the valve-body, projects out through the bushing $g^3$ and is provided with a downwardly-depending lip $e^\times$. The top of the bushing is formed with a trough $g^\times$, which is overhung by the lip $e^\times$ and which is provided with a discharge-jet $d^3$. A displacement-cylinder $e^3$ is mounted within the extension-chamber, the walls of said cylinder being raised above those of the extension $b^3$ and the top being preferably covered with a cap $h$, having a downwardly-depending rim or flange $h^3$, which overhangs the lip $e^\times$. The hollow valve-stem $B^3$ is closed at the top by a screw-plug $b^\times$, so that there is no communication between the interior of said stem and the displacement-cylinder. The lower portion of the stem $B^3$ below its guide-seat in the casing is connected with a water-supply pipe $c^3$, which communicates with the hollow interior of the stem. The water admitted by said pipe rises through the hollow stem and flows through the opening $f^3$ into the interior of the valve-body, thence rising in the annular space around the displacement-cylinder $e^3$ to the top of the extension-chamber, where it overflows at the lip $e^\times$ into the trough $g^\times$ and is discharged from said trough by the jet $d^3$.

In the following claim by the word "casing" I mean the casing of either the combustion-chamber or the exhaust-valve chamber, according to the situation of the valve.

Having thus described my invention, I claim—

In an internal-combustion engine, the combination of an exhaust-valve; a casing; a cylindrical extension-chamber mounted on the valve and projecting through the casing, said extension-chamber being open to the atmosphere; a hollow valve-stem whose interior communicates with the interior of the extension-chamber; means for supplying water to one end of the conduit formed by the extension-chamber and the hollow valve-stem; and means for discharging water at the other end of said conduit, whereby a direct passage of water through said conduit in one direction only is effected, substantially as set forth.

JOHN SALTAR, JR.

Witnesses:
JAMES H. BELL,
E. REESE.